(12) United States Patent
Eckardt

(10) Patent No.: US 8,246,871 B2
(45) Date of Patent: Aug. 21, 2012

(54) DEVICE AND METHOD FOR THE INJECTION MOLDING OF A MOLDED PART COMPRISING AT LEAST ONE VOID

(76) Inventor: Helmut Eckardt, Meinerzhagen (DE)

( * ) Notice: Subject to any disclaimer, the term of this patent is extended or adjusted under 35 U.S.C. 154(b) by 10 days.

(21) Appl. No.: 13/087,539

(22) Filed: Apr. 15, 2011

(65) Prior Publication Data

US 2011/0254203 A1    Oct. 20, 2011

(30) Foreign Application Priority Data

Apr. 17, 2010  (DE) .......................... 10 2010 015 453

(51) Int. Cl.
*B29C 45/00*    (2006.01)
(52) U.S. Cl. .................. 264/40.3; 264/572; 425/130
(58) Field of Classification Search ................ 264/40.3, 264/512, 572, 328.14, 319; 425/130, 110, 425/577, 579, 585
See application file for complete search history.

(56) References Cited

U.S. PATENT DOCUMENTS

| | | | | |
|---|---|---|---|---|
| 5,948,343 A | * | 9/1999 | Hiroki et al. ................. | 264/503 |
| 2002/0117783 A1 | | 8/2002 | Thomas | |
| 2011/0210482 A1 | * | 9/2011 | Sakamoto et al. ............ | 264/531 |
| 2011/0285057 A1 | * | 11/2011 | Ojiro et al. .................. | 264/328.1 |
| 2012/0068388 A1 | * | 3/2012 | Sakamoto et al. ............ | 264/573 |

FOREIGN PATENT DOCUMENTS

| | | |
|---|---|---|
| DE | 10 2008 023 473 A1 | 11/2009 |
| EP | 0 757 936 B1 | 9/2001 |
| EP | 0757936 B1 | 9/2001 |
| JP | 5031746 A | 2/1993 |
| JP | 08-229993 * | 9/1996 |
| JP | 11-114997 * | 4/1999 |

OTHER PUBLICATIONS

Search Report from the European Patent Office dated Jul. 12, 2011 for European Patent Application No. EP 11 00 2333.

* cited by examiner

*Primary Examiner* — Jill Heitbrink
(74) *Attorney, Agent, or Firm* — Lucas & Mercanti, LLP

(57) ABSTRACT

The invention relates to a device for the injection moulding of a moulded part (2) comprising a void (1), wherein a projectile (10) can be positioned at a fluid injection nozzle (8) in the region of a fluid aperture (9), which projectile (10) can be caused to flow in the direction of the longitudinal axis (L). To allow the production of moulded parts with enclosed voids in a better way the invention is characterized in that the fluid injection nozzle (8) comprises a section (11) entering into a cavity (5) of a mould, which section (11) is free from any undercut in a direction (E) of insertion of the fluid injection nozzle (8) into the cavity (5), wherein an angle ($\alpha$) is arranged between a longitudinal axis (L) and the direction (E) of insertion.

11 Claims, 5 Drawing Sheets

Figure 1:
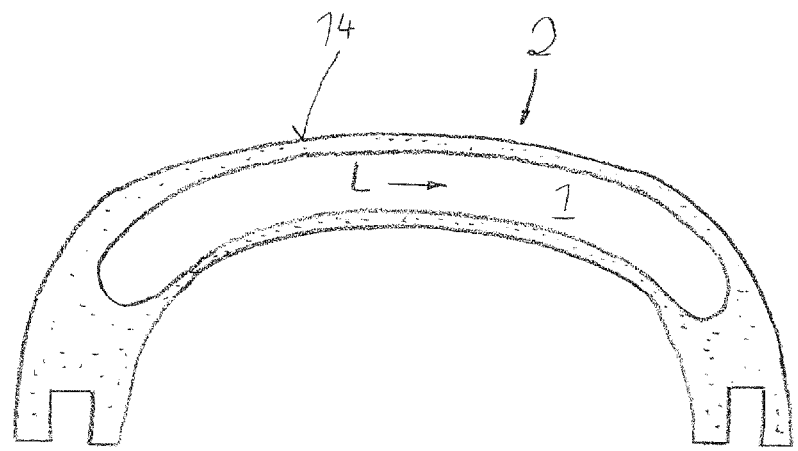

DEVICE AND METHOD FOR THE INJECTION MOLDING OF A MOLDED PART COMPRISING AT LEAST ONE VOID

This application claims the priority of German Application No. 10 2010 015 453.9 filed Apr. 17, 2010, this application is incorporated by reference herein.

The invention relates to a device for the injection moulding of a moulded part comprising at least one void, wherein the void extents at least in sections in the direction of a longitudinal axis of the moulded part with an injection moulding tool comprising at least two parts and having a cavity, which cavity has at least one cavity section extending in the direction of the longitudinal axis, wherein the injection moulding tool has at least one melt injection opening for plastic melt, wherein the injection moulding tool has an inlet aperture for a fluid injection nozzle, wherein a projectile can be positioned at the fluid injection nozzle in the region of the fluid aperture, which projectile can be caused to flow in the direction of the longitudinal axis through the still melted plastic due to the injected fluid. Furthermore, the invention relates to a method for the injection moulding of a moulded part comprising at least one void.

A device of this kind is known e. g. from EP 0 757 936 B1. Here it is described to inlay a projectile for the injection moulding of a plastic moulded part at a first longitudinal end of an injection moulding cavity in a projectile holder of the injection moulding tool and to cause the projectile through the cavity, which is filled with still pourable plastic, into an auxiliary cavity, which is located at the other second longitudinal end of the cavity by a fluid set under pressure. So, it can be attained to produce a void tube-shaped part in the cavity. For this purpose a conduit for the feeding of fluid under pressure is leading to the projectile holder where the fluid being under pressure can act onto the projectile and move it after a respective flow release.

A similar solution is described in DE 10 2008 023 473 A1.

It is beneficial that tube-shaped plastic moulded parts can be produced with the pre-known devices and methods respectively which have a very even wall thickness. In this respect, a better result is obtained compared with the classical gas assisted injection moulding technology. In general, this method can be carried out with any fluid (gas and liquid).

But it is a drawback, that practically no moulded parts with a closed void can be produced with the pre-known methods and devices using the mentioned projectile which is caused through the melt. Just those moulded parts are required in a substantial amount, e. g. as a hand grip of a car.

However, it is beneficial that the gas injection moulding can be carried out with relatively thin gas injection nozzles so that only a small opening (diameter of the gas injection nozzle between 3 and 8 mm) remains at the finish moulded part.

However, it is a disadvantage of the above mentioned projectile technology according to the known solutions that relatively big openings remain in the moulded part which results from the insertion of the projectile into the inner of the moulded part (see the mentioned DE 10 2008 023 473 A1).

Thus, it is an object of the invention to further develop a device of the above mentioned kind and a respective method so that the mentioned disadvantages can be avoided when using the projectile technology. Thus, it should become possible to produce plastic moulding parts with a substantial closed inner void, wherein the advantages of the projectile technology with respect to a very even wall thickness of the part are maintained and only a minimal opening is left in the finished moulded parts so that moulded parts can be produced which till now have been produced with the classical gas injection moulding method.

The solution of this object is characterized by the invention with respect to the device that the fluid injection nozzle comprises a section entering into the cavity, which section is free from any undercut in a direction of insertion of the fluid injection nozzle into the cavity, wherein an angle is arranged between the longitudinal axis and the direction of insertion, which angle is at least 30°. The angle is preferably between 8° and 90°.

Preferably, the moulded part encases the void completely, apart from the inlet aperture for the entering section of the fluid injection nozzle.

The section of the fluid injection nozzle entering into the cavity has preferably a cylindrical shape.

The fluid aperture at the section of the fluid injection nozzle entering into the cavity can be designed as a bore, which axis is preferably directed into the direction of the longitudinal axis of the moulded part. In this case a preferred embodiment of the invention proposes that the projectile comprises a cylindrical nose at its end being arranged opposite to the driving direction of the projectile, which nose is designed to be inserted into the fluid aperture in a sealed manner.

A holder for the projectile in the region of the fluid aperture of the fluid injection nozzle and the projectile can be designed in such a manner that the projectile is secured against twisting and tilting when inserted into the holder.

The projectile can have a contour of the outer circumference which corresponds to the outer contour of the moulded part considering a substantial constant wall thickness of the moulded part between the void and the outer circumference of the moulded part.

The holder for the projectile in the region of the fluid aperture of the fluid injection nozzle and/or the projectile can be designed in such a manner, that a resistance is existing against loosening of the projectile when being put onto the fluid injection nozzle, wherein especially the contact surface between the holder and the projectile is roughened.

The proposed method for the injection moulding of a moulded part by using the mentioned device comprises the following steps according to the invention:
a) positioning of the projectile on the fluid injection nozzle, inserting of the fluid injection nozzle together with the projectile into the cavity of the injection moulding tool, closing of the injection moulding tool;
b) injection of plastic melt into the cavity so that the section of the fluid injection nozzle extending into the cavity including the projectile is covered by the plastic melt, wherein the volume of the plastic melt is measured in such a way that it is just sufficient for the complete filling of the cavity considering the desired void;
c) injection of fluid by means of the fluid injection nozzle so that the projectile is shot and is caused to flow through the still liquid material along the longitudinal axis until the cavity is completely filled with plastic melt;
d) letting the plastic melt cool;
e) opening of the injection moulding tool, demoulding of the moulded part, extracting of the section of the fluid injection nozzle which extends into the moulded part.

Thus, this method is using a partly filling of the cavity with melt.

An alternative concept of the method according to the invention has the steps:
a) positioning of the projectile on the fluid injection nozzle, inserting of the fluid injection nozzle together with the projectile into the cavity of the injection moulding tool, closing of the injection moulding tool;

b) injection of plastic melt into the cavity, wherein the cavity of the injection moulding tool is completely filled with plastic melt;

c) injection of fluid by means of the fluid injection nozzle so that the projectile is shot and is caused to flow through the still liquid material along the longitudinal axis, wherein a part of the plastic melt is again expelled from the cavity of the injection moulding tool in an overflow cavity and/or in the space in front of the screw of an injection screw;

d) letting the plastic melt cool;

e) opening of the injection moulding tool, demoulding of the moulded part, extracting of the section of the fluid injection nozzle which extends into the moulded part.

Thus, this method operates with the "full shot" technique (complete filling of the cavity with melt), wherein excessive melt is spilled into an overflow cavity or into the space in front of the screw.

The single steps mentioned in the sub-steps a) and e) are not to be understood as a time sequence. The order of the insertion of the fluid injection nozzle and the placement of the projectile is dependent from the specific application. It can be provided in a specific application that at first the projectile is placed onto the fluid injection nozzle and then the fluid injection nozzle is inserted into the cavity. However, also the other order is possible and also a simultaneous process. Also, it can be provided that at first the fluid injection nozzle (outside of the parting surface of the mould) immerges into the form defining cavity of the injection moulding tool. Then, the projectile is placed onto the fluid injection nozzle and the injection moulding tool is closed. A corresponding procedure applies for the sequence of the single sub-step according to step e). Namely, it can be necessary that the extraction of the fluid injection nozzle extending into the moulded part must take place before the opening of the injection moulding tool (e. g. in the case that the fluid injection nozzle does not lie in the direction of demoulding).

The proposed device and method respectively have the following advantages:

The fixation of the projectile on the fluid injection nozzle takes place in such a way that the outlet aperture for the fluid is closed.

A small open injection nozzle with a device (e. g. a flat area) for the centering and holding of the projectile is used.

The wall thickness is adjustable by the selection of the diameter of the projectile which is preferably circular in the cross section.

The length of the void is adjustable by the amount of plastic melt injected into the cavity.

A small, simple and cost efficient injection nozzle without closure can be used.

The cooling times are relatively short because the plastic solidifies immediately (especially in the case when water is used as fluid).

The outer contour of the projectile can be adjusted to the outer contour of the moulded part for obtaining of even wall thicknesses.

In the drawing embodiments of the invention are shown.

Figure 2:
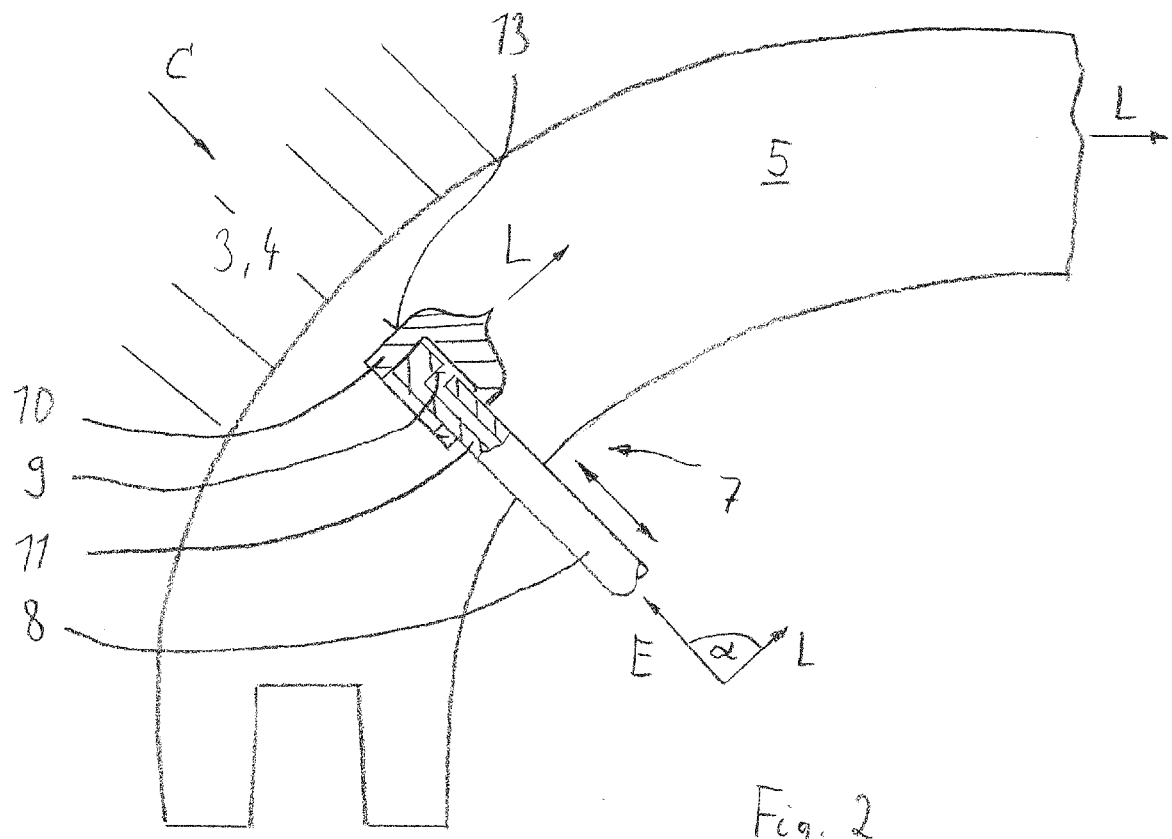
Figure 3:
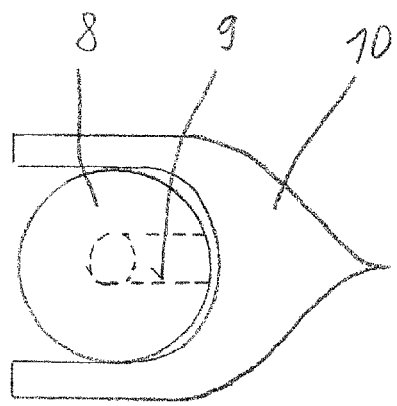
Figure 4:
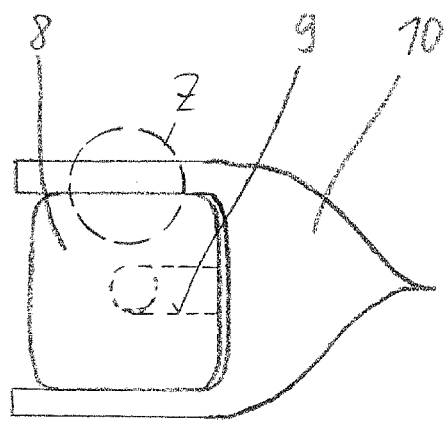
Figure 5:
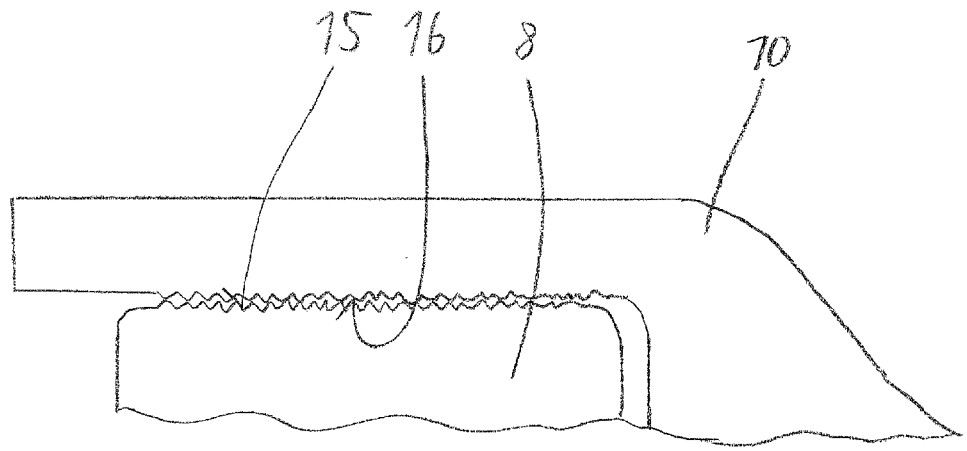
Figure 6:
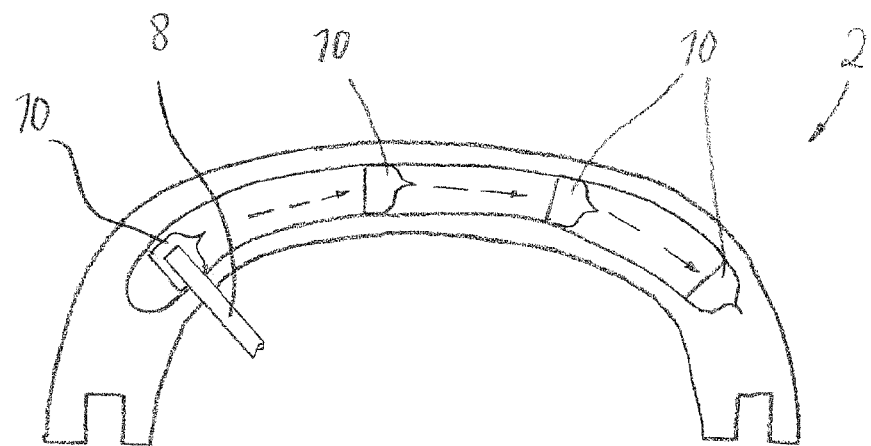
Figure 7:
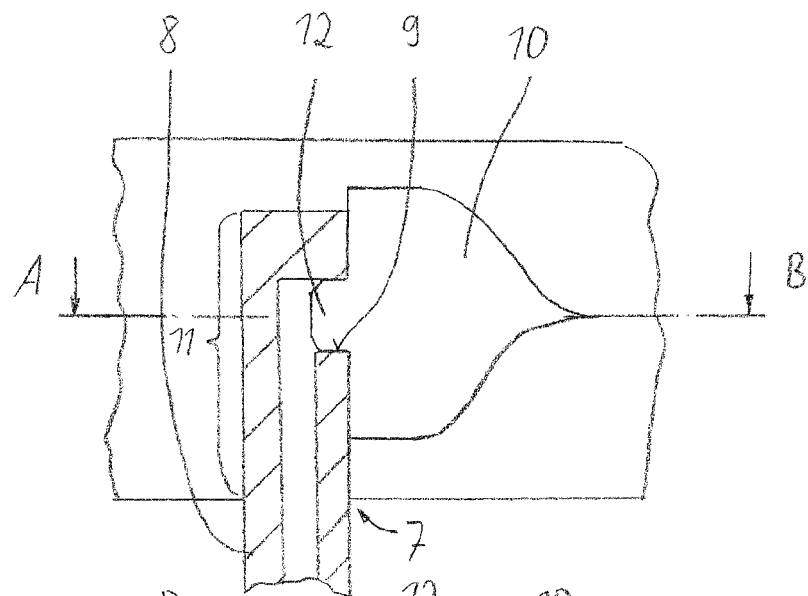
Figure 8:
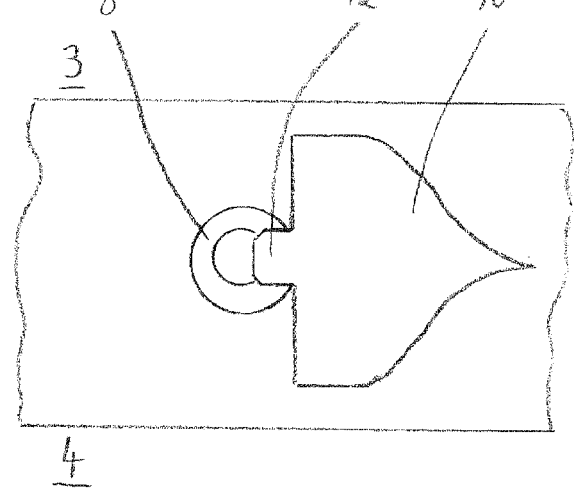
Figure 9A:
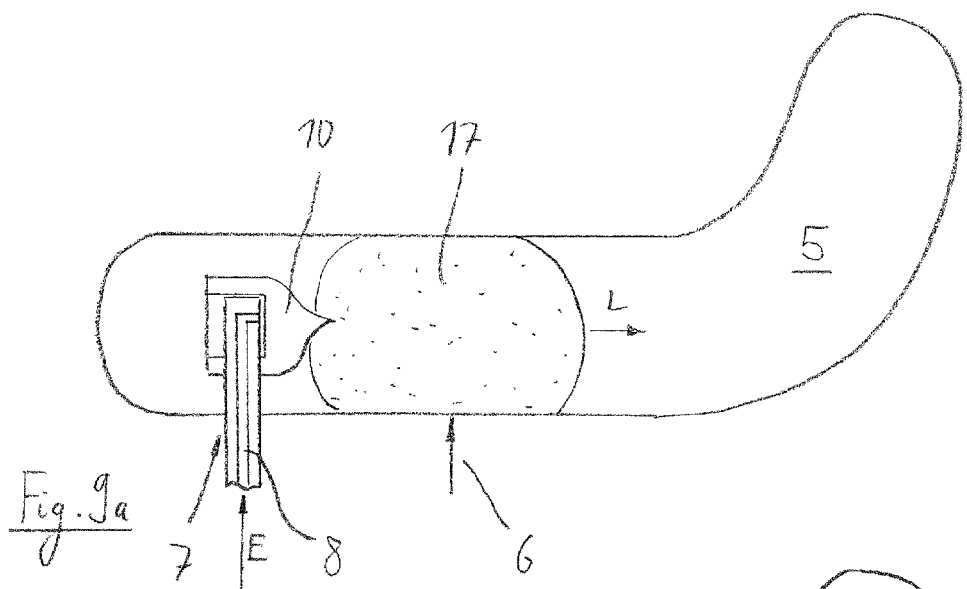
Figure 9B:
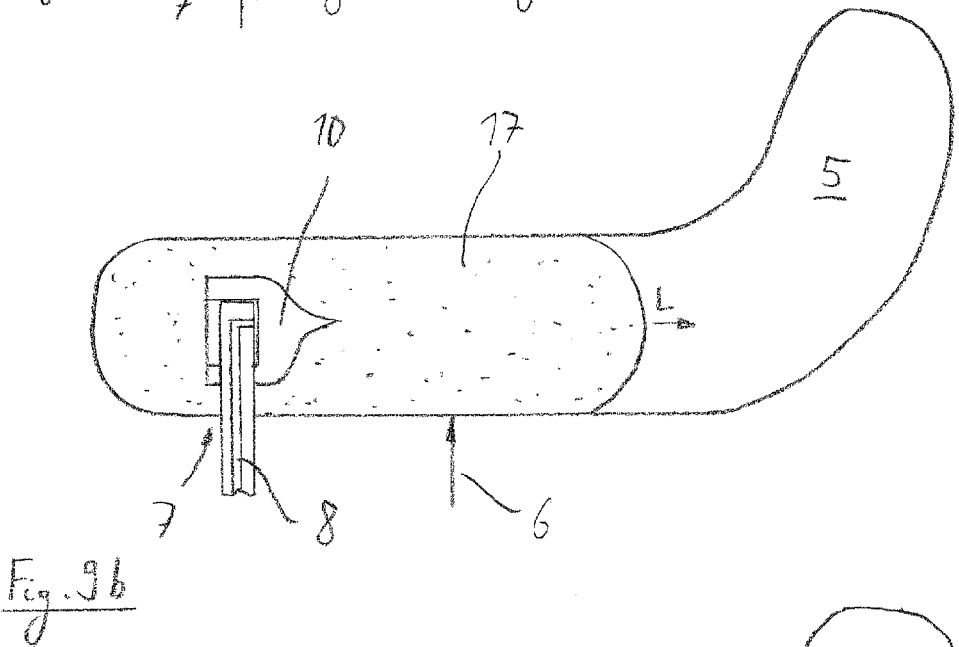
Figure 9C:
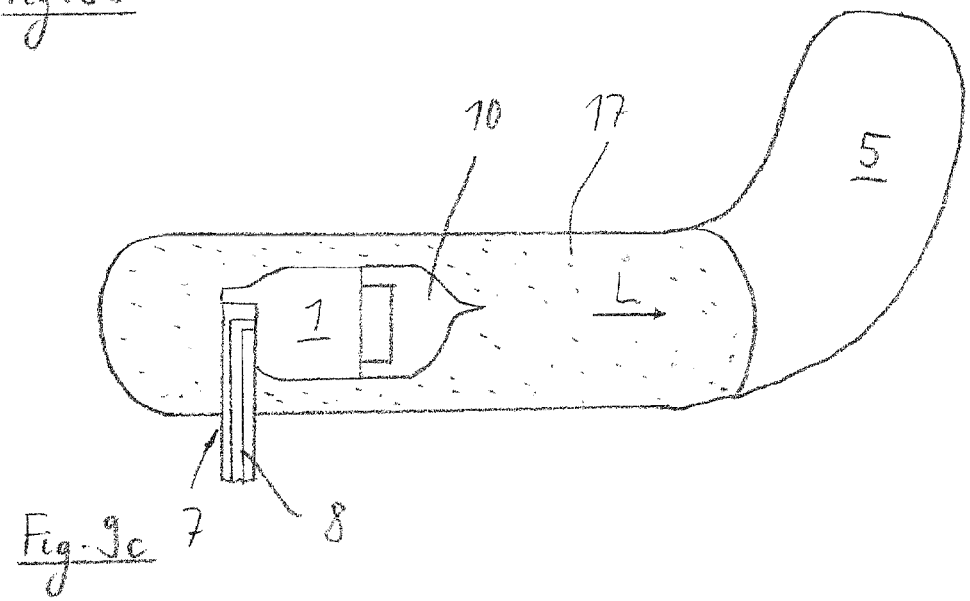
Figure 9D:
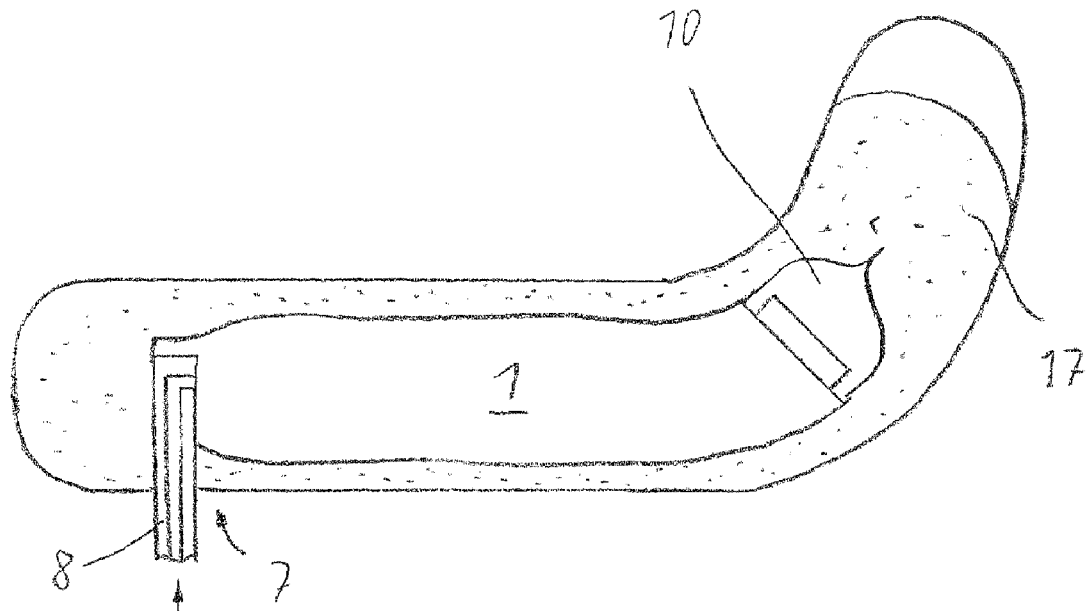
Figure 9E:
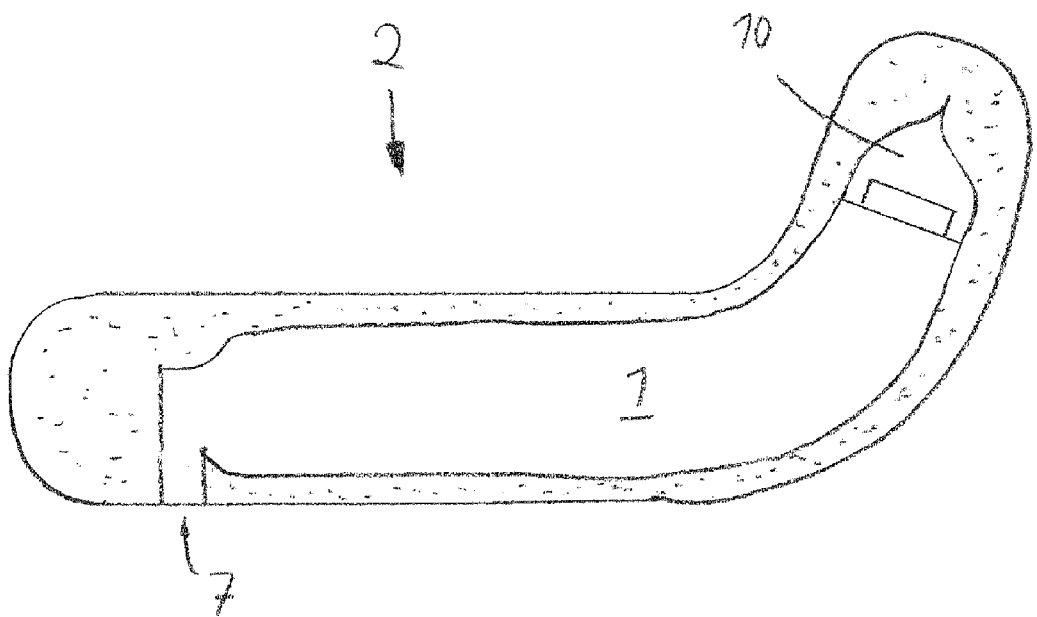

FIG. 1 shows in a sectional side view a plastic moulded part which has a void which extends along a longitudinal axis, FIG. 2 shows a section of an injection moulding tool which is equipped with a fluid injection nozzle for the accomplishment of the projectile technique, FIG. 3 shows the view of the fluid injection nozzle including projectile in the direction "C" according FIG. 2, FIG. 4 shows the view of the fluid injection nozzle including projectile in the direction "C" according FIG. 2 in an alternative embodiment of the invention, FIG. 5 shows the detail "Z" according to FIG. 4, wherein the roughening of two contacting surfaces is illustrated schematically, FIG. 6 shows schematically the process of the production of the moulded part according to FIG. 1 with the projectile technique, wherein several subsequent positions of the projectile are depicted, FIG. 7 shows a section of the fluid injection nozzle extending into the injection moulding cavity with projectile places onto the fluid injection nozzle in a side view analogue to FIG. 2, FIG. 8 shows the fluid injection nozzle with projectile placed on the same in the cross section A-B according to FIG. 7, FIG. 9a till FIG. 9e show the time sequence of the method for the production of a void plastic moulded part in five steps.

In FIG. 1 a grip-shaped moulded part 2 is shown which has a void 1. The void 1 extends along the direction of a longitudinal axis L. This longitudinal axis can have—as in the present case—a slight curvature. Of course, it is also possible that the moulded part has a more intensive curvature as it would be the case e. g. when a door handle is concerned. It is only important that a direction is defined along which the void extends and along which a projectile, which is described later, can be moved to produce the void. Furthermore, it is important that the void 1 is substantial closed; as it will become apparent later only a small cylindrical opening exists between the void 1 and the ambience which is caused by the insertion of a fluid injection nozzle which is described later. The size of the void can be defined exactly during the design of the moulded part.

Differences in the wall thickness in longitudinal direction as well as in the direction transverse to this direction are hard to avoid for moulded parts 2 as shown in FIG. 1. Thickened places and accumulation of material in the moulded part can occur. This influences the cooling time negatively and can cause sink marks in the moulded part.

Handle-shaped parts with voids can be produced with the gas injection moulding technology. It is a benefit in this case that the fluid injection nozzles for the injection of gas are small, e. g. they have a diameter between 2 and 8 mm. Thus, an opening with the diameter of the gas injection nozzle remains in the moulded part 2.

Smooth inner surfaces and shorter cooling times are possible by using the water injection moulding technology. Injectors for the water injection moulding technology require a bigger opening for the water injection, i. e. bigger outlet aperture cross sections, and thus a closure mechanism in the head of the nozzle to prevent the intrusion of the plastic melt which is firstly injected. So, those water nozzles are relatively big, e. g. 10 mm in diameter.

In the moulded part 2 an opening remains with this diameter. The use of a build-in water injector for the direct injection into the moulded part is mostly not possible due to the limited space. Thus, those injectors are mostly arranged in a sprue runner.

In the present case the production of the moulded part 2 takes place with the projectile technology. A projectile which is at first placed onto a fluid injector is caused through the injected plastic melt by a fluid.

Thereby the speed of the projectile can be controlled by the fluid pressure and/or by the amount of fluid and the fluid volume flow rate respectively, wherein this can take place also according to a predetermined profile.

The projectile can remain in the moulded part. By the projectile very even wall thicknesses can be obtained also in the case of redirections along the longitudinal axis L. Because the projectile displaces the melt from the inner wall and smoothens the wall simultaneously the attainable surfaces are also very good in the case of the use of glass fiber reinforced types. In this cases the projectile is placed onto the fluid injection nozzle in the direction of the desired void and, after the projectile is covered by melt, is shot into the part by the fluid.

Presently, specific measures are taken to produce the closed void 1 according to FIG. 1.

In the case of the application of the gas injection moulding technology e. g. injectors are used which have an annular gap for the gas outlet. For those moulded parts the injector must extend from the side into the cavity of the injection moulding tool either in the demoulding direction or must be moved into the moulded part and must be retracted before demoulding, wherein the injector can be arranged in the parting plane of the tool (but this is not mandatory).

For the injection of e. g. water as fluid a closure function for the water outlet aperture is additionally necessary.

According to the invention a solution for the injection is provided to hold the projectile onto the injector in the cavity in such a way that the projectile is held precisely in it position and the intrusion of melt during the pre-filling is prevented simultaneously.

In FIG. 2 is can be seen how a fluid injection nozzle 8 is positioned in the cavity 5 of a two-part injection moulding tool 3, 4 on the one hand to position the projectile 10 and on the other hand to inject the fluid which forms the void 1.

The fluid injection nozzle 8 which is arranged at the inlet aperture 7 of the injection moulding tool 3, 4 has a section 11 which extends into the cavity 5. In the fluid injection nozzle 8 a fluid aperture (bore) 9 is arranged which is used to inject the fluid. At least the entering section 11 has a cylindrical form which is free from any undercut.

The location of the fluid injection nozzle 8 is chosen workmanlike. It can lie in the parting plane of the tool, but this is not mandatory. It can be arranged e. g. in a pushing device of the tool or can extend directly into the cavity. In the latter case the fluid injection nozzle must be firstly moved into the open tool and then the projectile 10 is put onto the nozzle.

It is provided that the fluid injection nozzle 8 and namely its entering section 11 can be moved into and out of cavity 5 in the direction of the double arrow in FIG. 2. Accordingly, a direction E of insertion is defined along which the fluid injection nozzle 8 can be moved in its axial direction. It is important that the entering section 11 is free from any undercut seen in the direction E of insertion, so that the fluid injection nozzle 8 can be retracted also form the finished moulded part 2. To allow the production of the closed void 1 with the projectile technology it is further provided that the longitudinal axis L, along which the void 1 extends, and the direction E of insertion include an angle α, which is at least 30°. Preferably the angle is 90°. This is depicted in FIG. 2.

When the projectile 10 moves with its contour of the outer circumference 13 through the melted plastic material a substantial constant wall thickness is produced in the moulded part 2, i. e. the distance between the contour of the outer circumference 13 of the projectile 10 and the outer circumference 14 of the moulded part 2 (see FIG. 1) is constant.

As can be seen from the view C according FIG. 2 in FIG. 3 and FIG. 4 for two different embodiments the projectile 10 is firstly placed onto the fluid injection nozzle 8, wherein preferably an arrangement for preventing twisting and tilting is provided to hold the projectile 10 before its shot in the right and optimal position.

In FIG. 5 it is shown schematically that either the surface 15 of the fluid injection nozzle 8 which contacts the projectile 10 and/or the surface 16 of the projectile 10 which contact the fluid injection nozzle 8 is roughened so that the projectile 10 is held onto the fluid injection nozzle 8 securely and does not loosen without further action. This enhances the process stability of the method.

If fluid is injected via the fluid aperture (bore) 9 in the fluid injection nozzle 8 the projectile 10 is shot and moves along a course as it is schematically shown in FIG. 6 for four subsequent process steps. At the end of the process the projectile 10 is located in the right end position where it remains in the moulded part 2.

A specifically preferred solution of the design of the fluid injection nozzle 8 and the projectile 10 is depicted in FIG. 7 and FIG. 8. Here, it can be seen that the projectile 10 has a cylindrical nose 12 at its end opposite to the travelling direction of the projectile 10. With this cylindrical nose 12 the projectile 10 is inserted into the fluid aperture 9. This does not only have the advantage that the projectile 10 is held exactly in the desired position but also that the fluid aperture 9 is reliably sealed and closed so that no melt can intrude into the fluid aperture 9 in an early state of the method and cannot clog the same.

In FIG. 9a till FIG. 9e the sequence of the process is again shown for another moulded part.

In FIG. 8a is can be seen that the fluid injection nozzle 8 with the projectile 10 was moved in direction E of insertion into the cavity 5 of the injection moulding tool, wherein the direction E of insertion is perpendicular to the longitudinal axis L. of the desired void 1. The fluid injection nozzle 8 is located at the inlet aperture 7. At a remote location the melt injection opening 6 is located by which the plastic melt 17 is injected into the cavity 5. Thereby, the relative position of the locations 7 and 6 are selected in such a way that the plastic melt meets the front side of the projectile 10 as can be just seen in FIG. 9a.

If the amount of plastic melt 17 which is required for the forming of the moulded part 2 is injected into the cavity a situation is given as shown in FIG. 9b. The projectile 10 including the fluid injection nozzle 8 are completely covered by the plastic melt 17.

Now, fluid (water or gas) is injected via the fluid injection nozzle 8 as can be seen in FIG. 9c. Hereby, the projectile 10 is blasted from the fluid injection nozzle 8 and starts travelling in the longitudinal direction L through the plastic melt 17 and to form the void 1 behind it. Hereby, the projectile 10 displaces the plastic melt 17 towards the end of the flow path.

In FIG. 9d is can be seen that the projectile 10 has already covered the major part of its travel distance. The cavity of the injection moulding tool is almost completely filled.

The fluid pressure is kept so that the projectile 10 moves till the position is reached which is shown in FIG. 9e, in which the cavity is filled completely with plastic melt 17 because the projectile 10 has displaced the plastic melt correspondingly. Thereby, the moulded part 2 has exactly the size of the void 1 which is desired. The fluid injection nozzle 8 is again retracted against the direction E of insertion from the cavity and from the moulded part 2 respectively without damaging the moulded part. Apart from a small opening at the inlet aperture 7 for the fluid injection nozzle the void is completely closed.

After the pressure relieve, which can be adjusted according to a desired time profile, and the cooling of the plastic material the tool is opened and the injector retracted.

As far as a liquid (water) is used as the fluid this can pass off from the void 1 via the opening at the location 7.

The fluid injection nozzle 8 can be very small also for the reception of a big projectile 10 because the fluid injection nozzle 8 needs no closure function. The intrusion of melt during the pre-filling with melt is prevented by the projectile 10 itself by means of the cylindrical nose 12 or also simply by the fact that it covers the fluid aperture 9.

Thus, as an injection nozzle for the fluid, also for water, a tube with an aperture 9 is sufficient which causes the projectile 10 to move.

By this process it is possible to produce moulded parts 2 with a simple, small and cost effective injector which leaves only a small aperture in the moulded part. Also injectors with considerably less than 3 mm can be produced because it is a matter of a simple tube.

In general, the method can be operated with all known fluid injection techniques like e. g. the partly filling of the cavity with melt, the spill over cavity and the back pressure of melt material into the space in front of the screw.

The progression of the method can again be summarized as follows:

The injection moulding tool is opened.
The fluid injection nozzle (injector) is moved in the direction E of insertion into the cavity (arranged preferred but not mandatory in the parting plane of the injection moulding tool).
The projectile 10 is placed by means of a manipulator or by hand onto the fluid injection nozzle.
The injection moulding tool is closed.
Injection of plastic melt takes place in that manner that the projectile 10 is covered by melt against its later direction of movement.
Then the injection of fluid, the release of the projectile 10 from the fluid injection nozzle 8 and the causing of the projectile through the plastic melt takes place.
Subsequently, the plastic cools down and solidifies.
After a predetermined time the fluid pressure is released and the gas and the liquid respectively are vented e. g. via the fluid injection nozzle.
The fluid injection nozzle is retracted in direction E of insertion from the moulded part.
Then, the injection moulding tool is opened.
The moulded part including enclosed projectile is taken out.

The explained method can be used for the production of moulded parts, wherein firstly a partly filling of the cavity with melt takes place and the complete filling of the cavity takes place initially due to the melt displacement by means of the projectile moved by the fluid.

But also it is possible that the cavity is firstly filled completely with melt and then melt is expelled in a spill over cavity due to the projectile moved by the fluid pressure, wherein closure means can be arranged between the main and the spill over cavity which are controlled respectively. The projectile remains as shown in the cavity.

Instead into a spill over cavity melt can also be pressed back in the space in front of the screw.

LIST OF REFERENCE NUMERALS

1 void
2 moulded part
3, 4 injection moulding tool
3 half of the injection moulding tool
4 half of the injection moulding tool
5 cavity
6 melt injection opening
7 inlet aperture for the fluid injection nozzle
8 fluid injection nozzle
9 fluid aperture (bore)
10 projectile
11 entering section of the fluid injection nozzle
12 cylindrical nose
13 contour of the outer circumference
14 outer circumference
15 roughened region
16 roughened region
17 plastic melt
L longitudinal axis
E direction of insertion
α angle

The invention claimed is:

1. Device for the injection moulding of a moulded part (2) comprising at least one void (1), wherein the void (1) extents at least in sections in the direction of a longitudinal axis (L) of the moulded part (2) with an injection moulding tool (3, 4) comprising at least two parts and having a cavity (5), which cavity (5) has at least one cavity section extending in the direction of the longitudinal axis (L), wherein the injection moulding tool (3, 4) has at least one melt injection opening (6) for plastic melt, wherein the injection moulding tool (3, 4) has an inlet aperture (7) for a fluid injection nozzle (8), wherein a projectile (10) can be positioned at the fluid injection nozzle (8) in the region of the fluid aperture (9), which projectile (10) can be caused to flow in the direction of the longitudinal axis (L) through the still melted plastic due to the injected fluid, characterized in that the fluid injection nozzle (8) comprises a section (11) entering into the cavity (5), which section (11) is free from any undercut in a direction (E) of insertion of the fluid injection nozzle (8) into the cavity (5), wherein an angle (α) is arranged between the longitudinal axis (L) and the direction (E) of insertion, which angel (α) is at least 30°.

2. Device according to claim 1, characterized in that the angle (α) is between 80° and 90°.

3. Device according to claim 1, characterized in that the moulded part (2) encases the void (1) completely, apart from the inlet aperture for the entering section (11) of the fluid injection nozzle (8).

4. Device according to claim 1, characterized in that the section (11) of the fluid injection nozzle (8) entering into the cavity (5) has a cylindrical shape.

5. Device according to claim 1, characterized in that the fluid aperture (9) at the section (11) of the fluid injection nozzle (9) entering into the cavity (5) is designed as a bore, which axis is preferably directed into the direction of the longitudinal axis (L) of the moulded part (2).

6. Device according to claim 5, characterized in that the projectile (10) comprises a cylindrical nose (12) at its end being arranged opposite to the driving direction of the projectile (10), which nose (12) is designed to be inserted into the fluid aperture (9) in a sealed manner.

7. Device according to claim 1, characterized in that a holder for the projectile (10) in the region of the fluid aperture (9) of the fluid injection nozzle (8) and the projectile (10) are designed in such a manner that the projectile (10) is secured against twisting when inserted into the holder.

8. Device according to claim 1, characterized in that the projectile (10) has a contour of the outer circumference (13) which corresponds to the outer contour (14) of the moulded part (2) considering a substantial constant wall thickness of the moulded part (2) between the void (1) and the outer circumference (14) of the moulded part (2).

9. Device according to claim 1, characterized in that a holder for the projectile (10) in the region of the fluid aperture (9) of the fluid injection nozzle (8) and/or the projectile (10) are designed in such a manner, that a resistance is existing against loosening of the projectile (10) when being put onto the fluid injection nozzle (8), wherein especially the contact surface between the holder and the projectile (10) is roughened.

10. Method for the injection moulding of a moulded part (2) comprising at least one void (1), wherein the void (1) extents at least in sections in the direction of a longitudinal axis (L) of the moulded part (2) with a device according to claim 1, characterized in that it comprises the steps of:

a) positioning of the projectile (10) on the fluid injection nozzle (8), inserting of the fluid injection nozzle (8) together with the projectile (10) into the cavity (5) of the injection moulding tool (3, 4), closing of the injection moulding tool (3, 4);

b) injection of plastic melt into the cavity (5) so that the section (11) of the fluid injection nozzle (8) extending into the cavity (5) including the projectile (10) is covered by the plastic melt, wherein the volume of the plastic melt is measured in such a way that it is just sufficient for the complete filling of the cavity (5) considering the desired void (1);

c) injection of fluid by means of the fluid injection nozzle (8) so that the projectile (10) is shot and is caused to flow through the still liquid material along the longitudinal axis (L) until the cavity is completely filled with plastic melt;

d) letting the plastic melt cool;

e) opening of the injection moulding tool (3, 4), demoulding of the moulded part (2), extracting of the section of the fluid injection nozzle (8) which extends into the moulded part (2).

11. Method for the injection moulding of a moulded part (2) comprising at least one void (1), wherein the void (1) extents at least in sections in the direction of a longitudinal axis (L) of the moulded part (2) with a device according to claim 1, characterized in that it comprises the steps of:

a) positioning of the projectile (10) on the fluid injection nozzle (8), inserting of the fluid injection nozzle (8) together with the projectile (10) into the cavity (5) of the injection moulding tool (3, 4), closing of the injection moulding tool (3, 4);

b) injection of plastic melt into the cavity (5), wherein the cavity (5) of the injection moulding tool (3, 4) is completely filled with plastic melt;

c) injection of fluid by means of the fluid injection nozzle (8) so that the projectile (10) is shot and is caused to flow through the still liquid material along the longitudinal axis (L), wherein a part of the plastic melt is again expelled from the cavity (5) of the injection moulding tool (3, 4) in an overflow cavity and/or in the space in front of the screw of an injection screw;

d) letting the plastic melt cool;

e) opening of the injection moulding tool (3, 4), demoulding of the moulded part (2), extracting of the section of the fluid injection nozzle (8) which extends into the moulded part (2).

\* \* \* \* \*